United States Patent [19]

Fast et al.

[11] Patent Number: 4,718,627

[45] Date of Patent: Jan. 12, 1988

[54] STRIP MERCHANDISER WITH UNIVERSAL MOUNTING MEANS

[76] Inventors: Jacob Fast; Robert A. Fast, both of 7561 NW. 9th St., Plantation, Fla. 33317

[21] Appl. No.: 25,208

[22] Filed: Mar. 12, 1987

[51] Int. Cl.[4] ............ F16B 5/06

[52] U.S. Cl. ............ 248/225.1; 248/220.3; 248/223.4; 248/DIG. 11; 211/113

[58] Field of Search ............ 248/205.3, 205.1, 214, 248/215, 220.2, 220.3, 223.4, 224.4, 225.1, 225.2, 309.1, 309.2, 339, 340, DIG. 11; 40/10 R, 11 R; 211/113; 403/405.1

[56] References Cited

U.S. PATENT DOCUMENTS

| | | | |
|---|---|---|---|
| 4,179,138 | 12/1979 | Bogdanovic | 248/223.4 |
| 4,483,502 | 11/1984 | Fast | 248/220.2 |
| 4,497,464 | 2/1985 | Fast | 211/113 |
| 4,537,821 | 8/1985 | Fast | 248/221.4 |
| 4,539,766 | 9/1985 | Fast | 40/10 R |
| 4,541,598 | 9/1985 | Villanueva | 248/221.4 |
| 4,546,943 | 10/1985 | Fast | 248/205.3 |
| 4,572,380 | 2/1986 | Langwell | 248/225.1 |

*Primary Examiner*—J. Franklin Foss
*Assistant Examiner*—Robert A. Olson
*Attorney, Agent, or Firm*—Holman & Stern

[57] ABSTRACT

A strip merchandiser for suspending apertured products from a product display shelf has a versatile form of mounting portion providing optional forms of attachment for the strip merchandiser to the display shelf. The mounting portion is in the form of a panel which can be flexed so as to secure the panel in a concave price channel on the forward edge of a shelf. Further, the mounting panel is provided with a depressable head which can be used for attaching it in an aperture of a display shelf.

8 Claims, 11 Drawing Figures

STRIP MERCHANDISER WITH UNIVERSAL MOUNTING MEANS

BACKGROUND OF THE INVENTION

This invention relates to a strip merchandiser of the general type disclosed, for example, in prior U.S. Pat. Nos. 4,483,502 and 4,546,943.

Each of the above patents discloses a merchandise display element in the form of an elongate plastic strip (i.e., a strip merchandiser) which is suspended from the front edge of a merchandise display shelf or the like to itself suspend apertured products, such as blister packs, for display. The strips have a series of superimposed cutouts or the like which form integral upwardly facing individual support hooks for the products, and at their upper end, the strips have a mounting portion of one form or another for attaching same to a shelf. Thus, for example, certain of the mounting portions are specifically adapted for attachment in a concave price channel of the type often found on the forward edge of display shelves, while other mounting portions are specifically adapted for attachment to a shelf by insertion of an attachment element of the mounting portion into an aperture adjacent the forward edge of the shelf. Generally, however, the mounting portions are restricted to their particular mode of use. Thus, a mounting portion designed to attach in a price channel cannot be used to attach in a shelf aperture and vice versa. Accordingly, a storekeeper needs to keep both forms of strip merchandiser on hand if the alternative forms of attachment are needed.

It is an object of the present invention to provide a strip merchandiser of the general type disclosed in the aforesaid patents, but which has a more universal mounting portion enabling the merchandiser to be attached selectively and interchangeably, for example, in a price channel or to a shelf aperture.

Another object of the invention is to provide a strip merchandiser having a mounting portion capable of attachment to a shelf aperture in a more stable manner than previously known attachments.

SUMMARY OF THE INVENTION

The invention provides a strip merchandiser generally of the kind referred to above, but which has a novel form of mounting portion on one end of the strip enabling the strip to be suspended from different types of attachment means on a display shelf or the like. Thus, the strip includes a pair of slits with lateral sections extending inwardly from opposite edges of the strip and longitudinal sections extending from inner ends of the lateral sections toward the upper edge of the strip, the slits defining a mounting panel at the upper end of the strip with a split bottom edge defined by the lateral portions of the slits and a stem extending between the longitudinal sections of the slits which connects the panel to the body of the strip. The configuration of the slits enables the mounting portion to be flexed into engagement in a concave price channel of suitable width, with the bottom edge of the panel engaging a lower lip of the price channel and the upper edge of the panel which is the top edge of the strip engaging the upper lip of the price channel, and the stem protruding over the lower lip and suspending the body portion of the strip. Thus, the mounting panel provides a first mode of attachment for the strip.

A second mode of attachment for the strip is provided by a further slit substantially centrally located in the mounting panel defining a depressable head, preferably in the shape of an arrowhead, which can be depressed from the panel and worked into an aperture in a display shelf adjacent the forward edge of the shelf, so that the aforesaid stem extends over the edge of the shelf again suspending the body portion of the strip. The provision of a depressable attachment head within the confines of the mounting panel provides the strip with improved stability compared with similar attachment heads (as shown, for example, in U.S. Pat. No. 4,546,743) on the end of a stem extending from the outer edge of the strip insofar as with the former arrangement portions of the mounting panel adjacent the depressable head engage the upper surface of the shelf and prevent the strip as a whole from being tilted upwardly about its attachment point.

The strip may further be provided with a third form of attachment means comprising contact adhesive (normally covered by release paper) on a back surface of the mounting panel.

Additional features and advantages of the present invention will become apparent from the ensuing description and claims read in conjunction with the attached drawings.

DESCRIPTION OF THE PREFERRED EMBODIMENTS

Figure 1:
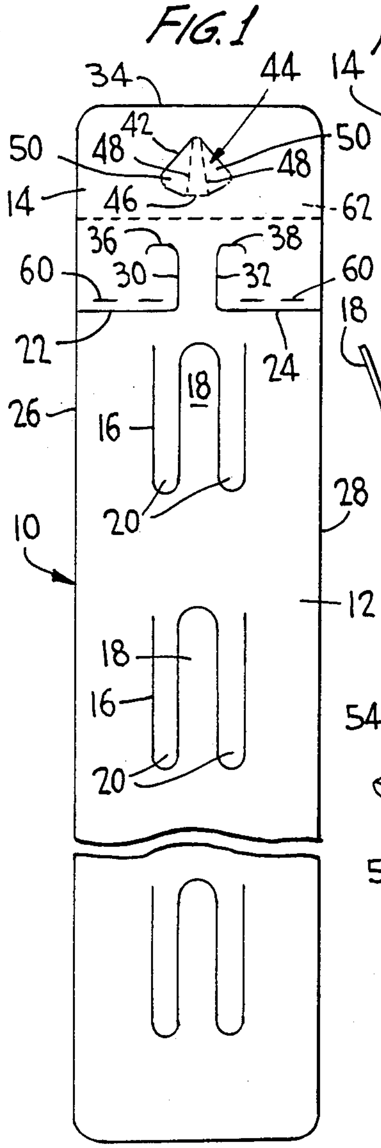
FIG. 1 is a face view of a first embodiment merchandiser strip in accordance with the present invention.
Figure 2:
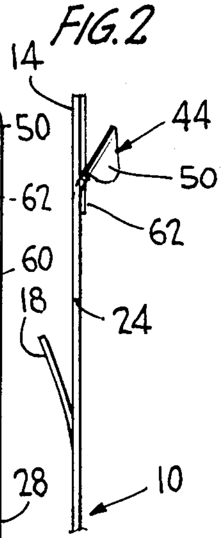
FIG. 2 is a side elevational view of a top part of the strip.

Referring initially to FIGS. 1 and 2, there is shown a first embodiment strip merchandiser 10 which may, for example, be die cut or the like from a plastic sheet in known manner, to provide an elongate body portion 12 and a mounting panel 14 at the top of the body portion. The body portion is provided with a series of superimposed slits 16 each in the form of an elongated W and each defining a central upwardly extending product suspension hook or finger 18 and outer stabilizing fingers 20 in a manner known per se.

The mounting panel 14 is separated from body portion 12 and defined by left and right hand slits having respective lateral sections 22, 24 extending inwardly from opposite side edges 26, 28 of the strip, longitudinal sections 30, 32 extending upwardly from the lateral sections toward top edge 34 of the strip, and radiased outwardly directed top sections 36, 38. The lateral sections 22, 24 of the slits effectively define a split bottom edge of panel 14, the top edge of which is defined by the top edge 34 of the strip. Further, the longitudinal sections 30, 32 of the slits define a stem 40 therebetween which effectively connects the body portion of the strip to the mounting panel. The stem may, for example, be about a ½ inch wide.

Substantially centrally located in the mounting panel 14 above stem 40 is a further arrowhead or diamond-shaped slit 42 defining an arrowhead or diamond-shaped depressable head 44 with a bend or score line 46 connecting the head 44 to panel 14. Also, head 44 has lengthwise bend or score lines 48 defining fold-down side tabs 50 whereby the head may be pressed into engagement in a shelf aperture and firmly secured therein as will be described.

Figure 3:
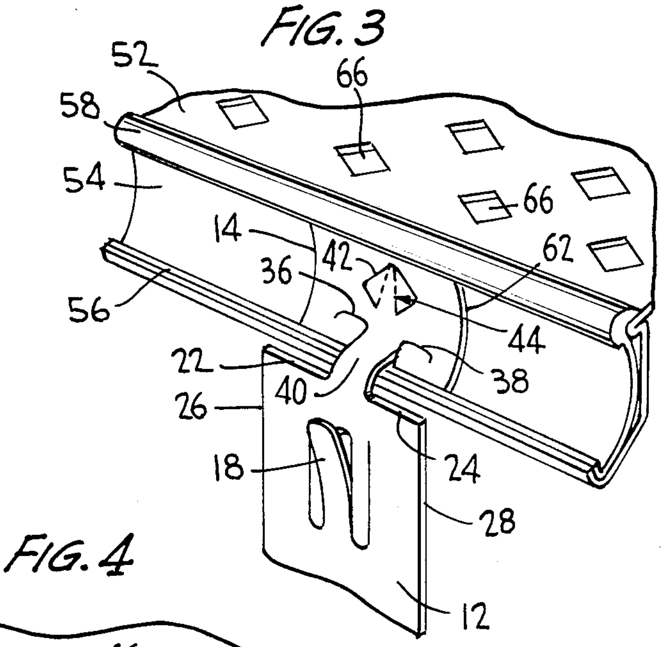
FIG. 3 is an in-use perspective view of the strip showing a first mode in which it can be suspended from a display shelf.
Figure 4:
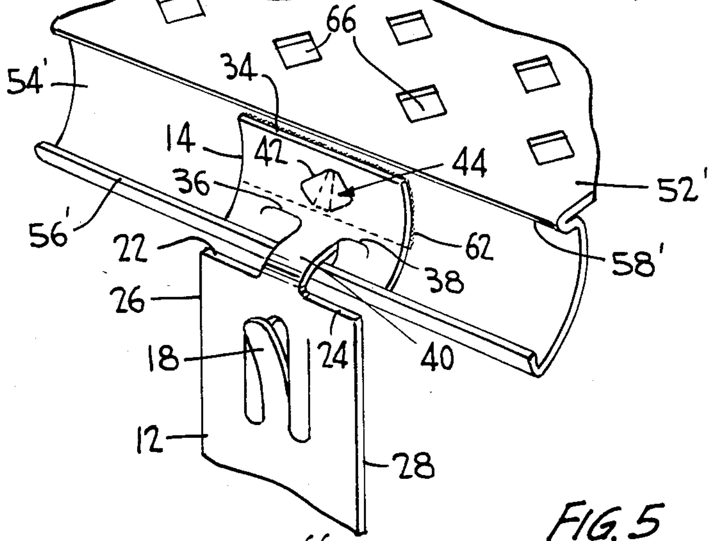
FIG. 4 is a view similar to FIG. 3 showing another mode of attachment of the strip to the shelf.

FIG. 3 illustrates one mode in which the mounting panel 14 can be used to suspend strip 10 at the forward edge of an apertured product display shelf 52 which a concave price channel 54 of known form along the forward edge. In this mode of suspension, panel 14 is flexed lengthwise into the price channel so that its split lower edge 22, 24 engages a lower lip 56 of the price channel and its top edge 34 engages an upper lip 58 of the price channel with stem 40 extending over the lower lip and suspending the body portion 12 below the shelf. This mode of suspension may be used when the width of the price channel is accurate for the designed height of panel 14 between its lower and upper edges. However, panel 14 is further provided with bend or score lines 60 (FIG. 1) defining lip portions adjacent its lower edge which can be folded so as to allow the panel to be used in a somewhat undersized price channel in a manner fully disclosed in co-pending U.S. patent application Ser. No. 06/756,235, filed July 18, 1985 and the disclosure of which is expressly incorporated herein by reference. Moreover, the back surface of panel 14 may be provided with a coating 62 of a contact adhesive (normally covered by release paper) which enables the panel to be adhered, for example, in an oversized price channel 54', as shown in FIG. 4, or to another support surface.

Figure 5:
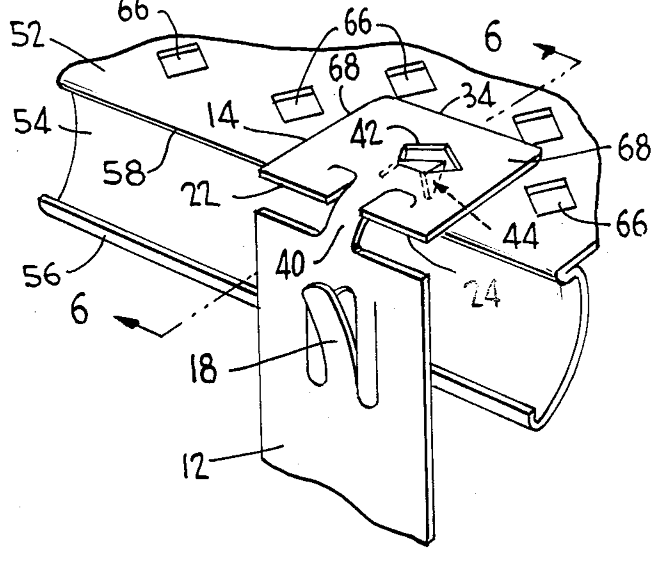
FIG. 5 is a further view similar to FIG. 3 showing yet another mode in which the strip can be suspended from a display shelf.
Figure 6:
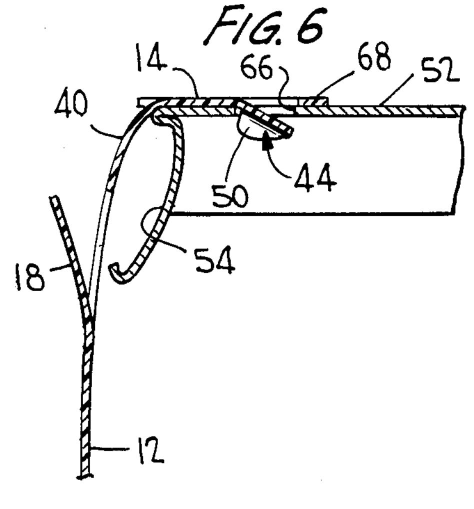
FIG. 6 is a sectional view on line 6—6 of FIG. 5.
Figure 7:
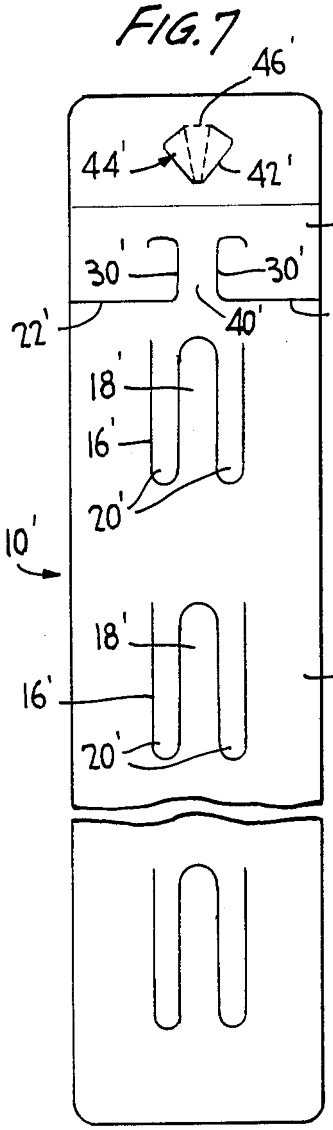
FIG. 7 is a further view of a second embodiment merchandiser strip in accordance with the invention.
Figure 8:
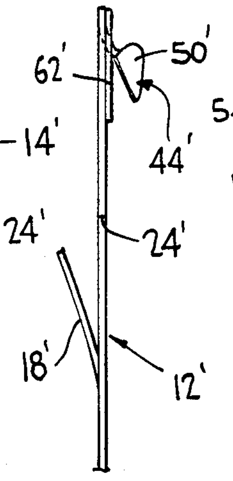
FIG. 8 is a view similar to FIG. 2 of the second embodiment strip.
Figure 9:
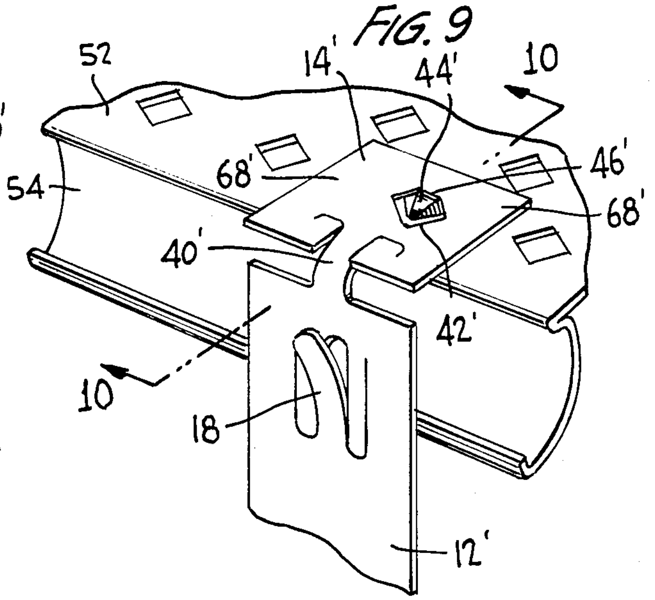
FIG. 9 is a view similar to FIG. 5 of the second embodiment strip.
Figure 10:
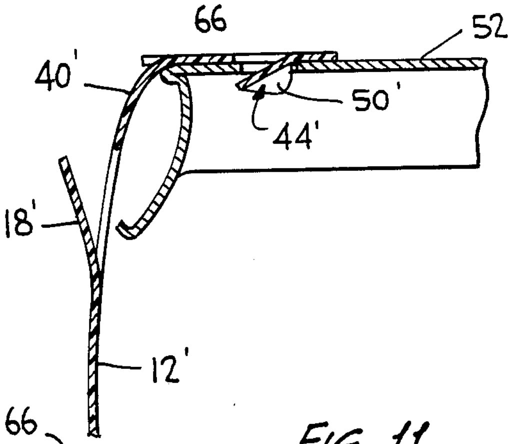
FIG. 10 is a sectional view on line 10—10 of FIG. 9.

FIGS. 5 and 6 show another mode in which the mounting panel 14 may be used to suspend the strip from shelf 52 by engagement of head 44 in one of the shelf apertures 66 adjacent the front edge of the shelf. To this end, the head is depressed, tabs 50 pressed down, and the head slid into aperture 66 from the front of the shelf. It is evident that the size of head 44 is related to that of the aperture such that upon insertion and release of the tabs 50 under the shelf (FIG. 6), the tabs effectively lock the head in the aperture. Also, as evident from FIG. 5, when the strip is suspended from the shelf in this mode, portions 68 of panel 14 adjacent head 44 engage the upper surface of the shelf and effectively prevent the strip as a whole from being tilted upwardly about head 44 to any appreciable extent. The width of stem 40 allows the stem to extend over the front of the shelf and suspend the body portion of the strip without having to bend the stem, and the stem is still of sufficient strength to support the suspended product.

Figure 11:
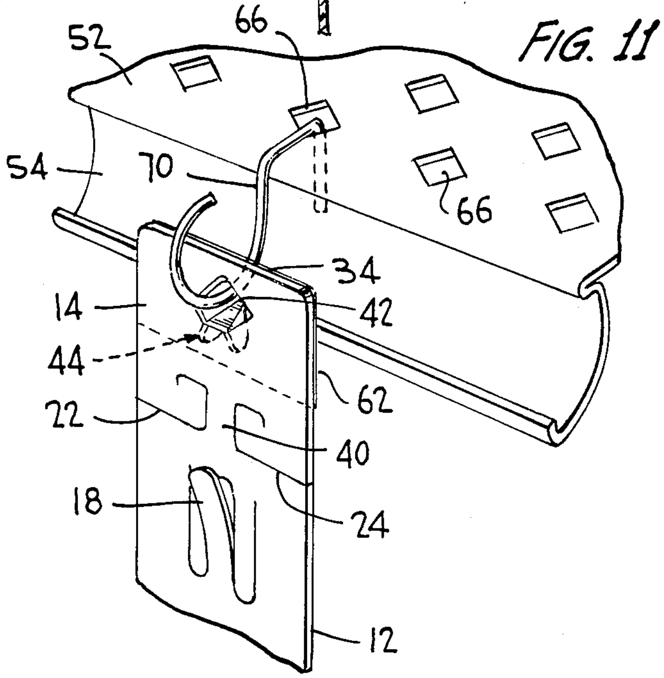
FIG. 11 is a perspective view similar to FIGS. 3–5 showing still a further mode of suspension of the first embodiment strip from a shelf.

FIG. 11 shows another mode of suspension of strip 10 wherein the aperture defined in panel 14 by the depressable arrowhead 44 is used to suspend the strip from an S-hook 70. The S-hook is shown as being itself suspended from a shelf aperture 66, but this is only by way of example.

FIGS. 7–10 show a second embodiment merchandiser strip 10' in accordance with the invention which is substantially similar to strip 10 in most respects and can be used in the same modes of attachment. Like numerals are used to denote like parts of the respective strips, the numerals being primed for the second embodiment strip. Essentially, the difference between strips 10 and 10' is that in strip 10, the bend line 46 which connects head 44 to panel 14 faces the bottom edge of the panel, while in strip 10', head 44' is effectively reversed and bend line 46' faces the top edge 34' of panel 14'. Accordingly, with the second embodiment strip, when securing head 44' in a shelf aperture 66 (FIGS. 9 and 10), the head is slid into the aperture from the back towards the front of the shelf, rather than from the front towards the back of the shelf, as in the first embodiment. The second embodiment head 44' is believed to provide a somewhat stronger form of attachment than head 44.

It will be evident that the invention accordingly provides strip merchandisers which have mounting portions providing a wide variety of options insofar as modes of attachment to support shelves and the like are concerned. The strips are accordingly well adapted to fulfilling the objects of the invention.

While only preferred embodiments of the invention have been described herein in detail, the invention is not limited thereby and modifications can be made within the scope of the attached claims.

We claim:

1. A strip merchandiser of plastic sheet material comprising an elongate body portion including longitudinally spaced product suspension hook defining means, and a mounting portion at one end of the body portion, the mounting portion being in the form a mounting panel separated from the body portion by respective slits having respective lateral sections extending inwardly from opposite longitudinal edges of the strip and respective longitudinal sections extending lengthwise of the strip from the lateral sections toward one end of the strip defining one edge of the panel, the longitudinal sections defining a stem therebetween connecting the mounting panel to the body portion of the strip, and the mounting panel including a further slit between said longitudinal sections and said one end of the strip, the further slit defining a depressable head for engaging in a shelf aperture and the like to form one mode of suspension with portions of the panel adjacent the head engaging an upper surface of the shelf to preclude upward tilting of the strip, the depressable head being connected to the mounting panel by a connection line located between said longitudinal sections and said one end of the strip, and wherein said lateral sections define a split edge of the panel, the panel being capable of being flexed between said split edge and said one edge of the strip for engagement in a concave price channel to provide another mode of suspension for the strip.

2. The invention as defined in claim 1, wherein the depressable head is substantially in the form of an arrowhead and the connection line is located between the arrowhead and the split edge of the panel.

3. The invention as defined in claim 1, wherein the depressable head is substantially in the form of an arrowhead and the connection line is located between the arrowhead and said one edge of the strip.

4. The invention as defined in claim 1, wherein the depressable head is substantially in the form of an arrowhead including fold lines extending from opposite ends of the connection line in a converging manner toward an apex at the opposite end of the arrowhead to provide foldable side tabs forming locking means for the arrowhead in a shelf or like aperture.

5. The invention as defined in claim 1, wherein the mounting panel includes a fold line adjacent the split bottom edge defining a split foldable lip portion of the panel for flexing the panel into an undersize price channel.

6. The invention as defined in claim 1, wherein the mounting panel is provided with a contact adhesive on one surface thereof.

7. The invention as defined in claim 1, in combination with a product display shelf wherein the strip is suspended from the shelf by insertion of the depressable head in an aperture of the shelf.

8. The invention as defined in claim 1, in combination with a product display shelf having a concave price channel on its forward edge wherein the strip is suspended from the shelf by attachment of the mounting panel in the price channel.

* * * * *